US008483964B2

(12) United States Patent
Chu

(10) Patent No.: US 8,483,964 B2
(45) Date of Patent: Jul. 9, 2013

(54) ESTIMATING RESERVOIR PROPERTIES FROM 4D SEISMIC DATA

(71) Applicant: Dez Chu, Bellaire, TX (US)

(72) Inventor: Dez Chu, Bellaire, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 13/663,062

(22) Filed: Oct. 29, 2012

(65) Prior Publication Data

US 2013/0060475 A1    Mar. 7, 2013

Related U.S. Application Data

(62) Division of application No. 12/725,062, filed on Mar. 16, 2010, now Pat. No. 8,332,154.

(60) Provisional application No. 61/183,231, filed on Jun. 2, 2009.

(51) Int. Cl.
*G01V 1/28* (2006.01)
*G06F 19/00* (2011.01)

(52) U.S. Cl.
USPC ............... 702/11; 367/38; 367/73; 702/14; 702/17

(58) Field of Classification Search
USPC ............... 702/6, 11, 12, 14, 17, 18, 47, 55, 702/89, 98, 155; 166/250.01; 367/38, 43, 367/73
See application file for complete search history.

(56) References Cited

U.S. PATENT DOCUMENTS

| 3,921,126 A | 11/1975 | Waters |
| 4,969,130 A | 11/1990 | Wason et al. |
| 5,018,112 A | 5/1991 | Pinkerton et al. |

(Continued)

FOREIGN PATENT DOCUMENTS

| CA | 2 542 416 | 5/2005 |
| WO | WO 00/19240 | 4/2000 |
| WO | WO 2008/140655 | 11/2008 |
| WO | WO 2009/027420 | 3/2009 |

OTHER PUBLICATIONS

Aarre, V. (2008) "On the presence and possible causes, of apparent lateral shifts below the Norne reservoir," Expanded Abstracts: 76th Annual Meeting of the SEG, pp. 3174-3178.

(Continued)

*Primary Examiner* — John H Le
(74) *Attorney, Agent, or Firm* — ExxonMobil Upstream Research Company Law Department

(57) ABSTRACT

Method for deriving a reservoir property change data volume from time shifts used to time-align 4D seismic survey data (31). The time alignment is performed on at least one angle stack of 4D data to determine a time-shift data volume (32). When multiple angle stacks are used, the time shifts are corrected to zero offset. A running time window is defined, and within each window the time shifts are best fit to a straight-line function of time (depth), one angle stack at a time (33). The slopes from the straight line fits from different angle stacks are averaged at each voxel in the data volume, which yields a reservoir properties ($\Delta v/v$) data volume (34). This data volume may be filtered with a low-pass filter to improve signal-to-noise (35). The resulting data volume may be merged with the 4D data volume to expand its bandwidth (36), or it may be converted into a reservoir saturation and pressure change data volume (38) using a rock-physics model (37).

5 Claims, 3 Drawing Sheets

U.S. PATENT DOCUMENTS

| | | |
|---|---|---|
| 5,148,406 A | 9/1992 | Brink et al. |
| 5,586,082 A | 12/1996 | Anderson et al. |
| 5,796,678 A | 8/1998 | Pisetski |
| 5,798,982 A | 8/1998 | He et al. |
| 5,831,935 A | 11/1998 | Luo et al. |
| 5,870,690 A | 2/1999 | Frenkel et al. |
| 5,873,051 A | 2/1999 | Van Bemmel et al. |
| 5,878,372 A | 3/1999 | Tabarovsky et al. |
| 5,905,657 A | 5/1999 | Celniker |
| 5,986,974 A | 11/1999 | Luo et al. |
| 6,028,820 A | 2/2000 | Pisetski |
| 6,041,018 A | 3/2000 | Roche |
| 6,057,561 A | 5/2000 | Kawasaki et al. |
| 6,125,330 A | 9/2000 | Robertson et al. |
| 6,266,619 B1 | 7/2001 | Thomas et al. |
| 6,317,384 B1 | 11/2001 | Luo et al. |
| 6,356,844 B2 | 3/2002 | Thomas et al. |
| 6,374,201 B1 | 4/2002 | Grizon et al. |
| 6,389,361 B1 | 5/2002 | Geiser |
| 6,438,069 B1 | 8/2002 | Ross et al. |
| 6,498,989 B1 | 12/2002 | Pisetski et al. |
| 6,529,833 B2 | 3/2003 | Fanini et al. |
| 6,574,563 B1 | 6/2003 | Nickel |
| 6,614,717 B1 | 9/2003 | Khan et al. |
| 6,694,263 B2 | 2/2004 | Fournier et al. |
| 6,715,551 B2 | 4/2004 | Curtis et al. |
| 6,778,918 B2 | 8/2004 | Delhomme et al. |
| 6,801,858 B2 | 10/2004 | Nivlet et al. |
| 6,826,483 B1 | 11/2004 | Anderson et al. |
| 6,853,921 B2 | 2/2005 | Thomas et al. |
| 6,904,368 B2 | 6/2005 | Reshef et al. |
| 6,906,982 B2 | 6/2005 | Calvert |
| 6,980,940 B1 | 12/2005 | Gurpinar et al. |
| 6,985,404 B2 | 1/2006 | Mallick |
| 6,989,841 B2 | 1/2006 | Docherty |
| 7,027,354 B2 | 4/2006 | Cole et al. |
| 7,079,952 B2 | 7/2006 | Thomas et al. |
| 7,242,637 B2 | 7/2007 | Van Den Beukel et al. |
| 7,355,923 B2 | 4/2008 | Reshef et al. |
| 7,456,113 B2 | 11/2008 | Rayandayan et al. |
| 7,478,024 B2 | 1/2009 | Gurpinar et al. |
| 7,523,003 B2 | 4/2009 | Robertsson et al. |
| 7,577,061 B2 | 8/2009 | Williamson et al. |
| 7,620,534 B2 | 11/2009 | Pita et al. |
| 7,660,711 B2 | 2/2010 | Pita et al. |
| 7,739,089 B2 | 6/2010 | Gurpinar et al. |
| 7,752,022 B2 | 7/2010 | Fornel et al. |
| 7,859,943 B2 | 12/2010 | Herwanger |
| 7,953,585 B2 | 5/2011 | Gurpinar et al. |
| 8,086,426 B2 | 12/2011 | El Ouair et al. |
| 2006/0153005 A1 | 7/2006 | Herwanger et al. |
| 2008/0004847 A1 | 1/2008 | Bradford |
| 2008/0170468 A1 | 7/2008 | Brain et al. |
| 2008/0291781 A1 | 11/2008 | Williamson et al. |
| 2010/0254217 A1 | 10/2010 | Chu et al. |

OTHER PUBLICATIONS

Gret, A. et al., (2006), "Monitoring in situ stress changes in a mining environment with coda wave interferometry," *Geophys. J. Int.* 167, pp. 504-508.

Hatchell, P.J. et al., (2005), "Measuring reservoir compaction using time-lapse timeshifts", Expanded Abstracts: 75th Annual Meeting of the SEG, pp. 2500-2504.

Hawkins, K. et al., (2007), "Production-induced stresses from time-lapse time shifts: A geomechanics case study from Franklin and Elgin fields", *The Leading Edge,* pp. 655-662.

Hudson, T. et al., (2005), "Genesis field, Gulf of Mexico, 4-D project status and preliminary lookback", 75th Annual Meeting of the SEG, pp. 2436-2440.

Janssen, A.L. et al. (2006), "Measuring velocity sensitivity to production-induced strain at the Ekofisk Field using time-lapse timeshifts and compaction logs," Expanded Abstracts, 76th Annual Meeting of the SEG, pp. 3200-3204.

Rickett, J. et al. (2001), "Cross-equalization data processing for time-lapse seismic reservoir monitoring: A case study from the Gulf of Mexico," *Geophysics* 66, pp. 1015-1025.

Rickett, J. et al. (2006), "Compacting and 4D time strain at the Genesis Field," Expanded Abstracts, 76th Annual Meeting of the SEG, pp. 3215-3219.

Roste, T. et al. (2006), "Estimation of layer thickness and velocity changes using 4D prestack seismic data", *Geophysics* 71, No. 6, pp. S219-S234.

Roste, T. et al., (2007), "Monitoring overburden layer changes and fault movements from time-lapse seismic data on the Valhall Field," *Geophys. J. Int.* 170, pp. 1100-1118.

Sarkar, S. et al. (2003), "On the inversion of time-lapse seismic data," 2003 SEG Ann. Meeting, 4 pgs.

Snieder, R. (2006), "The Theory of coda wave interferometry", *Pure and Applied Geophysics* 163, No. 2-3, pp. 455-473.

Veire, H.H. et al. (2006), "Stochastic inversion of pressure and saturation changes from time-lapse AVO data", *Geophysics* 71. No. 5, pp. C81-C92.

ESTIMATING RESERVOIR PROPERTIES FROM 4D SEISMIC DATA

CROSS-REFERENCE TO RELATED APPLICATION

This application is a divisional of U.S. patent application Ser. No. 12/725,062, filed Mar. 16, 2010, entitled "Estimating Reservoir Properties From 4D Seismic Data," and claims the benefit of U.S. Provisional Patent Application 61/183,231, filed 2 Jun. 2009, the entirety of which is incorporated by reference herein.

FIELD OF THE INVENTION

The invention relates generally to the field of hydrocarbon exploration and production, and more particularly to reservoir monitoring. Specifically, the invention is a method for deriving reservoir property change volume from time shifts and enhancing 4D seismic data for saturation and pressure change interpretations.

BACKGROUND OF THE INVENTION

Time-lapse (4D) seismic technology is the use of 3D seismic surveys acquired at different times in the productive life of a reservoir. 4D seismic can enhance asset value by increasing recovered volume and production rate, and by decreasing operating costs. 4D seismic is the only field-wide history match constraint in common use.

The most common 4D volumes used for reservoir characterization interpretation are 4D difference volumes. The difference volumes are the differences between monitor (post production) and base (often pre-production) seismic surveys. To generate difference volumes, one of the processes required is time alignment. The time alignment finds and applies the time shifts required to have seismic events on a monitor survey aligned with the corresponding events on a base survey so a meaningful difference can be taken. Time shifts themselves also contain very useful information about velocity change caused by the hydrocarbon depletions. However, they are rarely used by interpreters because the volumes are very blocky and could not be used in the same manner as difference volumes.

Time shifts are commonly used for detecting reservoir compaction and stress change in reservoir or overburden (Hudson et al. 2004, Hatchall et al. 2005, Roste et al. 2007). Production will cause the pressure decrease within the reservoir. If the pressure of the reservoir is not well maintained, compaction of the reservoir will occur, especially for younger rocks. This compaction will most likely be coupled with subsidence of the overburden and overburden dilation. The time shift data volume can be used to quantify such effects by looking at the time shifts at different time/depth levels.

In papers at the 2006 SEG meeting, Rickett et al. (2006) and Janssen et al. (2006) used time shifts to estimate the strain caused by production. Rickett shows that taking the first derivative of the time shifts enables interpreters to interpret time shifts in a manner similar to interpreting 4D difference volumes. As will be discussed later, taking a derivative of the data is an unstable operation that introduces noise into the results.

Chu and Gist (2008) used time shifts to create a low frequency model for their inverted saturation change model by calibrating the $\Delta v/v$ volume with low frequency saturation change at well locations.

SUMMARY OF THE INVENTION

In one embodiment, the invention is a method for transforming 4D seismic survey data taken over a producing reservoir to a reservoir property change data volume which provides, by location in a subsurface volume, a corresponding fourth dimension (time) change in a parameter that corresponds to a physical property of the reservoir, said method comprising:

(a) obtaining 4D seismic amplitude data, comprising a base survey seismic amplitude data volume and a later monitor survey seismic amplitude data volume;

(b) determining a data volume of time shifts required to time align the two survey data volumes;

(c) fitting time shifts within a running data window to a straight line function of time (depth in the time-shift data volume), wherein the window includes at least three time samples or the seismic data volumes include at least two angle stacks or both; and (d) determining slope of each fitted straight line, thereby generating a data volume of slope values, which corresponds to a reservoir property change data volume.

In another embodiment, the invention is a computer-implemented method for transforming 4D seismic survey data taken over a producing reservoir to a reservoir property change data volume which provides, by location in a subsurface volume, a corresponding fourth dimension (time) change in a parameter that corresponds to a physical property of the reservoir, said method comprising:

(a) obtaining at least two angle stacks of 4D seismic amplitude data, comprising a base survey seismic amplitude data volume and a later monitor survey seismic amplitude data volume;

(b) determining a data volume of time shifts required to time align the two survey data volumes;

(c) correcting the time shifts to zero offset;

(d) obtaining for each voxel in the data volume a value of time shift representing an average of all angle stacks; an (e) computing a derivative of the average time shifts with respect to time (depth in the time-shift data volume) for each voxel in the data volume; thereby generating a data volume that corresponds to a reservoir property change data volume.

In yet another embodiment, the invention is a method for managing production from an oil or gas reservoir, comprising:

(a) obtaining a reservoir property change data volume representing the reservoir, using a method within the scope of claim 1, which is incorporated herein by reference; and (b) using the reservoir property change data volume to determine a saturation or pressure change data volume within the reservoir; and (c) using the saturation or pressure change data volume to manage production from the reservoir.

BRIEF DESCRIPTION OF THE DRAWINGS

The present invention will be better understood by referring to the following detailed description and the attached drawings in which.

The invention will be described in connection with example embodiments. To the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Figure 3:
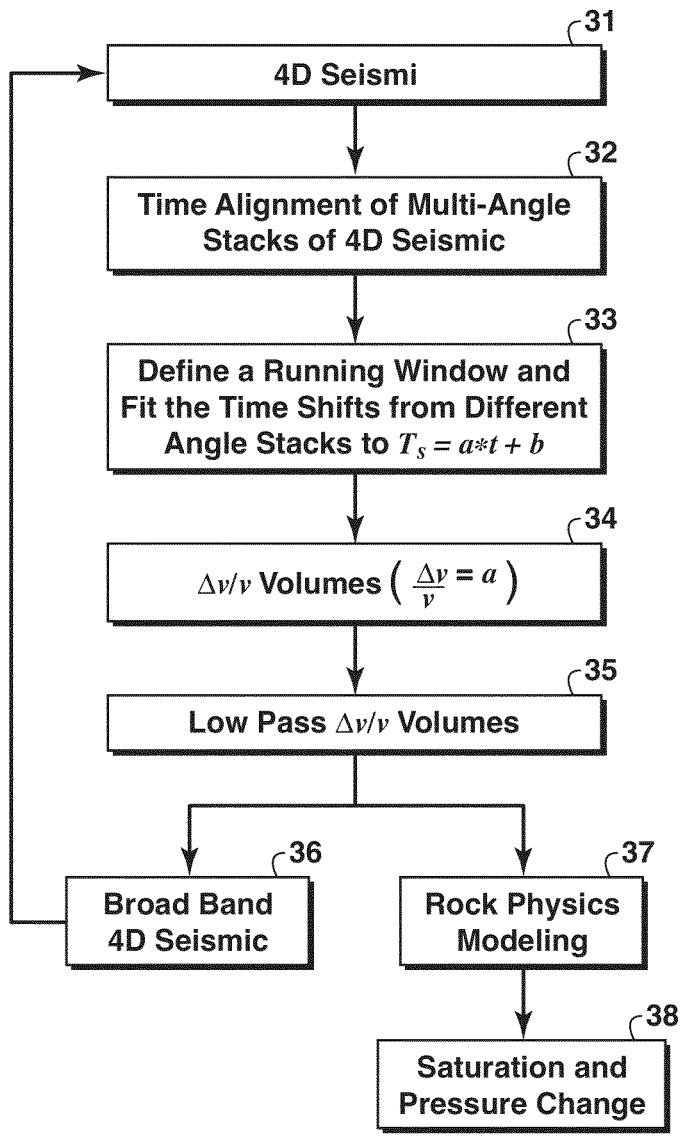
FIG. 3 is a flow chart showing basic steps in one embodiment of the present inventive method for deriving reservoir property change volume from time shifts and enhancing 4D seismic data for saturation and pressure change interpretations.

In some embodiments, this invention is a method for utilizing time shifts of one or more angle stacks to create an interpretable reservoir property change data volume that encapsulates the information contained in 4D seismic difference volumes. Optionally, the volume may be merged with a regular 4D seismic difference data volume to create a broadband 4D seismic data volume (step 36 in the flow chart of FIG. 3) wherein the new volume contributes to the low end frequency response. Alternatively, a resulting $\Delta v/v$ data volume 34 may be converted to a saturation/pressure change volume 38 by applying a rock physics model 37.

Time shift is the difference in two-way seismic travel times that are observed when analyzing seismic surveys conducted at different times. Those surveys are commonly termed as monitor (post-production) and base (often pre-production) seismic surveys. Time shifts can be attributed to two sources: 1) pore-fluid property changes that alter the velocity at which seismic signals pass through a layer or interval, and 2) changes in seismic velocity and layer thickness that occur both inside and outside of the layer or overall reservoir because of reservoir compaction and stress-strain redistribution in the surrounding formations.

Let $T_{shift0}$ be the time lag required to shift a monitor survey to align with a base survey at time t for zero offset seismic. For a layer with thickness z, the change in relative seismic travel time is (Landro and Stammeijer, 2004)

$$\frac{dT_{shift0}}{dt} = \frac{\Delta v}{v} - \frac{\Delta z}{z} \tag{1}$$

where t represents the two-way travel time across the layer and v is the velocity of the layer, and $\Delta v = v_m - v_b$, $v_m$=velocity for the monitor survey and $v_b$=base survey velocity. Hatchell and Bourne (2005) used time shifts to estimate the compaction of compacting reservoirs and layers within reservoirs by implicitly assuming the velocity change due to fluid property changes is a minor component. However, compaction (as expressed by $\Delta z$) does not always contribute significantly to the time shifts, especially when reservoir rock is stiff or pressure is well maintained. In this case, the main contributing factor to an observed time shift will be the velocity change from either fluid change (such as saturation levels) or pressure change. Under this condition, second term above can be dropped:

$$\frac{dT_{shift0}}{dt} = \frac{\Delta v}{v} \tag{2}$$

In other words, to derive relative velocity change information because of production in a non-compacting reservoir, one can simply take the derivative of time lags between monitor and base. Hereinafter, the derivative of the time shifts may be referred to as $\Delta v/v$. However, most of the method disclosed below, such as deriving a reliable derivative volume, is still applicable when compaction plays a significant role. $\Delta v/v$ and the term reservoir property change are used interchangeably herein.

The derivative is an unstable operator, being a two-point operation (t and t+dt), and resultant data sections tend to be very noisy and hard to interpret. To improve the signal-to-noise ratio, the time shifts from different angles may be combined to extract the reservoir condition change information. Because the ray path will be different for different angle stacks, for the same condition change in the reservoir, the magnitude of the time shifts from far offsets will be greater than from near offsets. This can be seen from the following.

Figure 1:
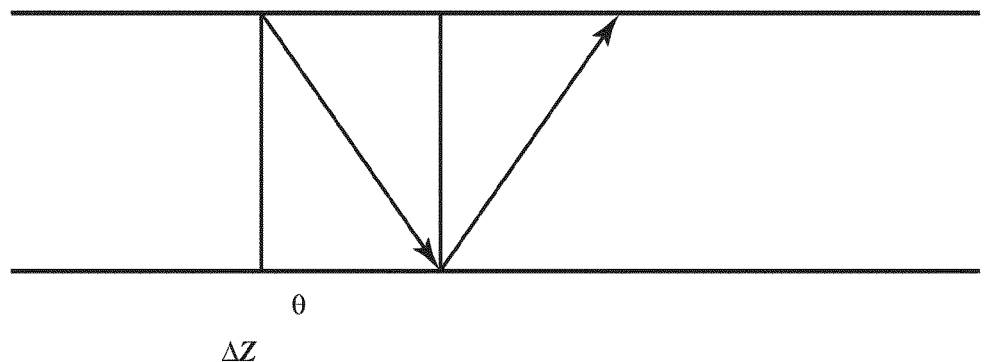
FIG. 1 is a sketch showing a thin layer with thickness $\Delta z$.

FIG. 1 is a sketch showing a thin layer with thickness of $\Delta z$. Assume the p-velocity corresponding to the baseline survey is v and that corresponding to the monitor survey is $v+\Delta v$ and that the layer thickness remains the same. For a seismic ray traveling with angle $\theta$, the travel time within the layer will be:

$$T_b = 2\frac{\Delta z/\cos\theta}{v}$$

for the base survey, and $$T_m = 2\frac{\Delta z/\cos\theta}{v+\Delta v}$$

for the monitor survey, and therefore $$\Delta T(\theta) = 2\left(\frac{\Delta z}{v+\Delta v} - \frac{\Delta z}{v}\right) * \frac{1}{\cos\theta} = \Delta T_0/\cos\theta$$

where $\Delta T_0$ is the time shift caused by velocity $\Delta v$ for zero offset and * denotes multiplication. Thus, the time shifts from different angle stacks, $T_{shift}(\theta)$ relative to the zero offset, $T_{shift\_c}$, are given by:

$$T_{shift\_c} = T_{shift}(\theta) * \cos(\theta) \tag{3}$$

One can average corrected time shifts from different angle stacks to get a "smooth" version of time shifts, and then take the derivative of the time shifts to obtain a more stable $\Delta v/v$.

A sliding (running) window may be used, and corrected time shifts from different angle stacks within the window may be fitted to a straight line:

$$T_{shift\_c} = a*t+b \tag{4}$$

The best fitting parameter "a" may be taken as the derivative of the time shifts at the center of the running window. The fitting scheme provides a way to combine the information from different angles and allows the flexibility to use a different number of samples for the $\Delta v/v$ calculation.

Since the time shifts were derived generally by cross-correlating the monitor seismic with base seismic data within a certain window, the information it contains is most reliable at the low end of the frequency spectrum. Therefore, in preferred (but not all) embodiments of the present invention, the Δv/v values are filtered by a low cut filter before they are used for 4D interpretations.

The potential applications of Δv/v volumes can be various, for example: a) provide a low frequency model for difference based inversion or simply merge with 4D difference seismic volume to obtain a broad 4D seismic; b) modify a base low frequency model for improved monitor impedance inversion; c) cross-plot with 4D difference seismic for improved 4D reservoir characterizations; and d) apply rock physics models to get saturation and pressure change.

To merge with 4D seismic difference data for broad band 4D seismic, the 4D seismic difference may be rotated to quadrature phase (−90°) from zero phase. In order to reduce the notch (a frequency in the amplitude-frequency spectrum where the amplitude is substantially lower than its neighbors), the spectrum of the difference volume can be reshaped the to enhance low frequency content.

Figure 2:
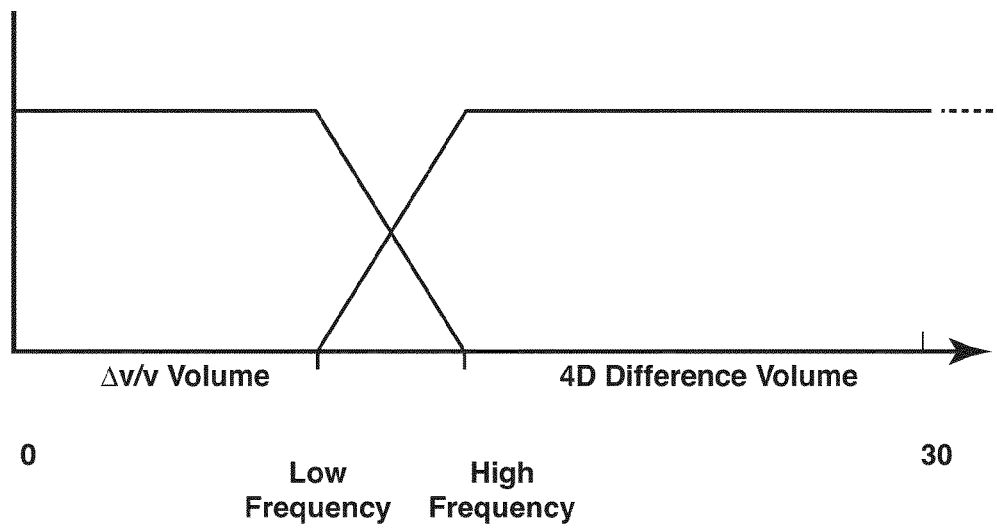
FIG. 2 illustrates a merge filter for merging $\Delta v/v$ information with 4D difference volume.

Δv/v is usually in the order of a few to teens percent. A scale factor is needed to scale the Δv/v values to 4D seismic amplitudes. The scale factor is determined in such way that it makes the spectrum of combined 4D seismic as close to the well log spectrum as possible. Merging can be done through a merge filter such as is shown in FIG. 2.

Fitting Time Shifts to a Straight Line

A time shift ($T_i$) at time $t_i$ falls within a time window with N samples. (Preferably N≧3, particularly if only one angle stack is used.) The uncertainty of each time shift (σ) can be estimated from the correlation coefficient from the time alignment process or simply set to 1. To fit the time shifts within the time with a straight line specified by equation (4), one may minimize the objective function:

$$\chi^2(a, b) = \sum_{i=1}^{N} \left( \frac{T_i - a*t_i - b}{\sigma_i} \right)^2 \quad (5)$$

$\chi^2$ can be minimized by taking the first derivative relative to a and b and setting them equal to zero to solve for a and b. Assuming that $$S = \sum_{i=1}^{N} \left(\frac{1}{\sigma_i}\right)^2, S_t = \sum_{i=1}^{N} \frac{t_i}{\sigma_i^2}, S_T = \sum_{i=1}^{N} \frac{T_i}{\sigma_i^2},$$

$$S_{tT} = \sum_{i=1}^{N} \frac{t_i*T_i}{\sigma_i^2}, S_{tt} = \sum_{i=1}^{N} \frac{t_i*t_i}{\sigma_i^2},$$

one has $$a = \frac{S*S_{tT} - S_t*S_T}{\Delta} \quad (6)$$

where $\Delta = S*S_{tt} - S_t^2$. (The solution for the constant term b is of no interest to the present invention.) The uncertainty of α, and therefore Δv/v, can be estimated through propagation of errors from the uncertainty of $T_i$:

$$\sigma_a = \sqrt{\frac{S}{\Delta}} \quad (7)$$

The error value can be used as a filter to screen out the unreliable calculations of Δv/v. An uncertainty volume can be generated and sent to seismic data interpreters as a companion volume to a Δv/v volume so they can gauge the value of information in the Δv/v volume.

Correction for Dipping Layers

Time varying time shifts can be obtained by correlating monitor surveys with base seismic trace by trace (1D) or by 3D warping methods (Aarre, 2008, Rickett & Lumley 2001). One of the common procedures for 3D/4D seismic processing is migration, which requires a velocity model. In order to maintain maximal repeatability, usually one single velocity model is used to migrate both base and monitor surveys. This will result in slightly over/under migration for at least one of the surveys because velocity has likely changed at some regions as a result of production. For flat or near flat reservoir, the time shifts from the 1D and 3D methods are same with each other. When the reservoir is dipping significantly, a residual lateral and vertical shift is introduced by over/under migration. Ideally, 3D warping is able to account for such shifts. A correction is needed to correct the time shifts produced by 1D method. Ricket and Lumley (2001) suggest that for a very simple one layer model, lateral shift vector (Δx) and vertical shift (ΔT) can be approximated by:

$$\Delta x = -2vtp\Delta v \quad (8)$$

$$\Delta T = -2vtp^2\Delta v \quad (9)$$

where v is the baseline velocity, Δv is the 4D velocity change, t is the baseline one-way time and p is the slowness (reciprocal of apparent velocity). By taking the derivative of ΔT and recognizing that p=sin θ/v, one has:

$$\frac{\Delta v_\theta}{v} = (1 + \sin^2\theta)\frac{\Delta v}{v} \quad (10)$$

Here, θ is the angle of dipping layer. In other words, to obtain true Δv/v, a factor of $1/(1+\sin^2\theta)$ needs to be applied for dipping reservoirs.

As with any 4D seismic work, differences between surveys are meaningful only if conditions are substantially duplicated in data gathering and in processing. Preferably, the 4D seismic data are co-processed to maintain the maximum repeatability of base and monitor seismic data, with the processing done in such a way that it retains the time shifts caused by subsurface condition changes, such as saturation change or pressure change.

The present inventive method may be performed with as few as one angle stack of seismic data. If two or more angle stacks are used, the correction to zero offset must be applied in order that a single best straight line can be fitted to time shifts from different angle stacks. The window must contain at least two different positions to determine a straight line. In a typical seismic data set, the sample size might (for example) be 2 ms. A time shift is computed for each time sample. The window might be selected to be 10 ms wide, meaning that the window contains five data points (values of time shift). Thus, in Eqn. 5, N=5. The five time shift values are plotted (if one envisions this as being done manually) and a best fit straight line is determined for those five data points. The slope of that line is determined and may be assigned to the middle time of the window, becoming a voxel value in the reservoir property change data volume. However, if data from a second angle stack are used, there will be ten points to determine the line, and so on. Then the window is slid in time. The window may be moved in increments as small as one time sample. The process described above is then repeated.

EXAMPLE

The present inventive method was applied to a 4D seismic survey. Referring to the flow chart of FIG. 3, 4D seismic data was obtained (step 31), meaning data from a base survey and a later monitor survey. Then a single data volume (full stack) of time shifts between the two surveys was computed (step 32). For these surveys, one of the main reservoirs is a deep reservoir located mostly under the facility (platform, floating storage or the like) and near a salt dome. Maximum pressure draw-down is about 400 psi from the base survey to the monitor survey. Therefore, the contribution of reservoir compaction from production to the time shifts can be neglected. The derivative of the time shifts is the relative velocity change caused either by saturation (oil, gas, water) and pressure change, i.e. Eqn. (2) applies.

Figure 4:
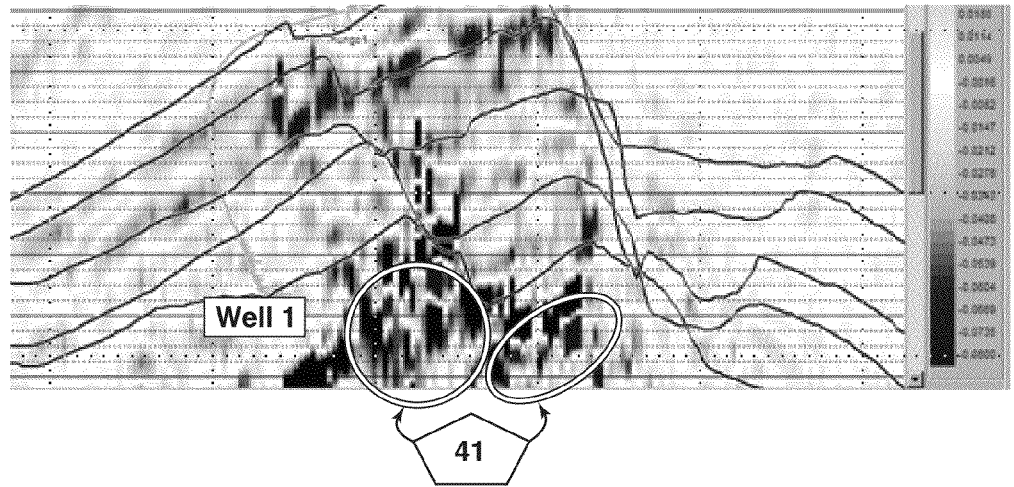
FIG. 4 is a data display showing a reservoir property change data volume derived from a single angle stack time-shift data volume by numerically computing the derivative of the time shifts.

FIG. 4 shows the $\Delta v/v$ data volume (with $\Delta v/v$ indicated by shade of gray according to the scale on the right, and the vertical and horizontal axes indicating depth and horizontal location, respectively) computed by taking the first derivative of the time shifts (a known alternative to the present inventive method's step 33) from the time-shift data volume and then filtering the resulting $\Delta v/v$ data volume (34) with a low pass filter step 35). The low-pass filtering step is not essential for every embodiment of the invention. The signal-to-noise ratio is generally better at low frequencies. Region surfaces (horizons) are shown in the drawing. Overall, FIG. 4 shows that velocity has decreased in both upper and lower reservoirs, which is consistent with a gas saturation increase in both reservoirs. However, the character of the velocity events is not very well defined, and unwanted vertical striations are apparent across the sections. Noise below the reservoir (see ovals 41) is stronger than the signal at the reservoir level.

Figure 5:
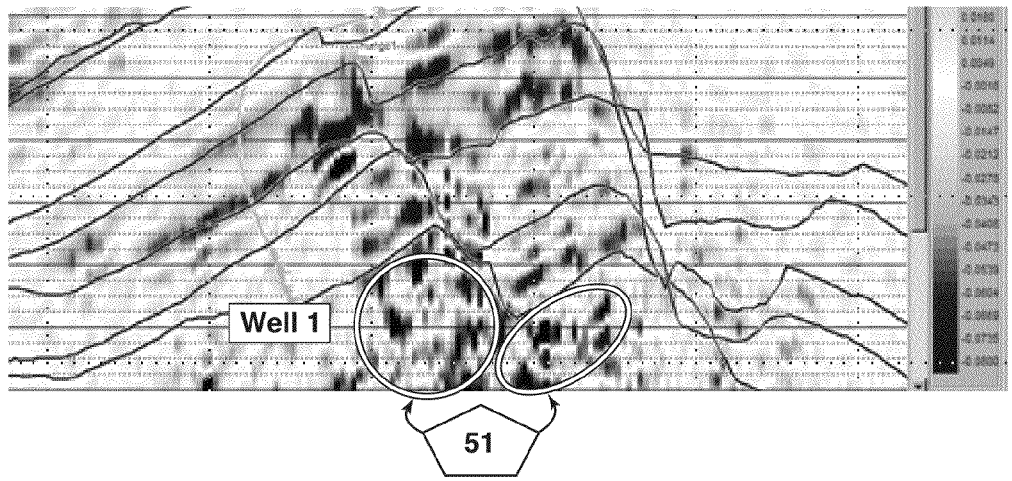
FIG. 5 is a data display showing a reservoir property change data volume derived from time shifts of three different angle stacks using an optimal line fitting embodiment of the present inventive method.

Next, $\Delta v/v$ was calculated by line-fitting (Eqn. 4) the time shifts of the from near, far and full stacks simultaneously, and computing the slope a of the resulting best-fit straight line (a preferred way of performing step 33). The time shifts from near, far and full are corrected to the zero offset. The 'zero offset' time shifts within a running window of 10 ms were fitted to a straight line as specified in Eqn. 4. The slope was recorded as the $\Delta v/v$ for the center of the window. The $\Delta v/v$ is then filtered with the same low-pass filter as in the application that used the first derivative of the time shifts. The character of the gas saturation events are better defined by the new volume (FIG. 5), especially in the deeper reservoir. Noise below the reservoir (ovals 51) is reduced in the new volume as well.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Some or all of the steps of the inventive method may be implemented on a computer.

REFERENCES

Aarre, "On the presence and possible causes, of apparent lateral shifts below the Norne reservoir," Expanded Abstracts: 76th Annual Meeting of the SEG (2008).

Chu and Gist, 2008, "Inversion of 4D seismic data," PCT Patent Application Publication No. WO 2008/140655 (2008).

Hatchell and Bourne, "Measuring reservoir compaction using time-lapse timeshifts," Expanded Abstracts: 75th Annual Meeting of the SEG (2005).

Hudson et al., "Genesis field, Gulf of Mexico, 4-D project status and preliminary lookback," 75th Annual Meeting of the SEG (2005).

Janssen and Smith, "Measuring velocity sensitivity to production-induced strain at the Ekofisk Field using time-lapse time-shifts and compaction logs, Expanded Abstracts," 76th Annual Meeting of the SEG (2006).

Rickett and Lumley, "Cross-equalization data processing for time-lapse seismic reservoir monitoring: A case study from the Gulf of Mexico," Geophysics 66, 1015-1025 (2001).

Rickett et al., "Compacting and 4D time strain at the Genesis Field, Expanded Abstracts," 76th Annual Meeting of the SEG (2006).

Roste et al., "Monitoring overburden layer changes and fault movements from time-lapse seismic data on the Valhall Field," Geophys. J. Int. 170, 1100-1118 (2007).

The invention claimed is:

1. A computer-implemented method for transforming 4D seismic survey data taken over a producing reservoir to a reservoir property change data volume which provides, by location in a subsurface volume, a corresponding fourth dimension change in a parameter that corresponds to a physical property of the reservoir, said forth dimension being time, said method comprising:
   (a) obtaining at least two angle stacks of 4D seismic amplitude data, comprising a base survey seismic amplitude data volume and a later monitor survey seismic amplitude data volume;
   (b) for each angle stack, determining a data volume of time shifts required to time align the base survey data volume and the monitor survey data volume;
   (c) correcting the time shifts to zero offset;
   (d) obtaining for each voxel in a data volume a value of time shift representing an average of all angle stacks; and
   (e) using a computer, computing a derivative of the average time shifts with respect to time, or depth in the average time-shift data volume, for each voxel in the average time-shift data volume thereby generating a data volume that corresponds to a reservoir property change data volume.

2. The method of claim 1, further comprising filtering the reservoir property change data volume with a low pass filter.

3. The method of claim 2, further comprising merging the reservoir property change data volume with a 4D seismic amplitude difference volume determined from the 4D seismic amplitude data, thereby increasing bandwidth at the low frequency end.

4. The method of claim 1, further comprising converting the reservoir property change data volume into a fluid saturation or pressure change data volume by applying a rock physics model.

5. The method of claim 1, further comprising estimating location-dependent reservoir compaction $\Delta z/z$ occurring between when the base survey was performed and when the monitor survey was performed, and correcting the reservoir property change data volume determined in (e) for compaction by adding $\Delta z/z$ to the data volume's value at each voxel.

* * * * *